United States Patent [19]

Amadio et al.

[11] Patent Number: 4,751,724
[45] Date of Patent: Jun. 14, 1988

[54] AUTOMATIC TELEPHONE LINE FAULT LOCATOR

[75] Inventors: Delano Amadio, Padova; Alessandro Lazzari, Castelfranco Veneto, both of Italy

[73] Assignee: Flitel S.p.A., Padova, Italy

[21] Appl. No.: 874,769

[22] Filed: Jun. 16, 1986

[30] Foreign Application Priority Data

Jun. 20, 1985 [IT] Italy .................... 41575 A/85

[51] Int. Cl.$^4$ ............................................. H04B 3/46
[52] U.S. Cl. ........................................ 379/24; 379/26
[58] Field of Search .................. 379/24, 22, 26; 324/509, 512, 522, 524, 525; 379/399, 405

[56] References Cited

U.S. PATENT DOCUMENTS

| | | | |
|---|---|---|---|
| 3,912,884 | 10/1975 | Membrino et al. | 370/13 |
| 4,001,559 | 1/1977 | Osborne et al. | 379/22 |
| 4,025,736 | 5/1977 | Chlupsa | 379/22 |
| 4,028,507 | 6/1977 | Hoppough | 379/27 |
| 4,186,282 | 1/1980 | Ellson | 379/22 |
| 4,213,016 | 7/1980 | Brockmann et al. | 379/22 |
| 4,568,802 | 2/1986 | Bradley et al. | 379/22 |

Primary Examiner—Stafford D. Schreyer
Attorney, Agent, or Firm—Guido Modiano; Albert Josif

[57] ABSTRACT

This automatic telephone line fault locator comprises a portable box-type structure which comprises an interface section including switches and having input terminals for connection to a line being controlled, a voltage and current measuring section electrically connected to the interface section for selectively measuring currents and voltages of suitable portions of the line being controlled, a control unit including a logic-arithmetic and control section coupled to the interface section and the measuring section for controlling the position of the switches and receiving the measured current and voltage values and calculating therefrom the position of any fault on the line.

10 Claims, 4 Drawing Sheets

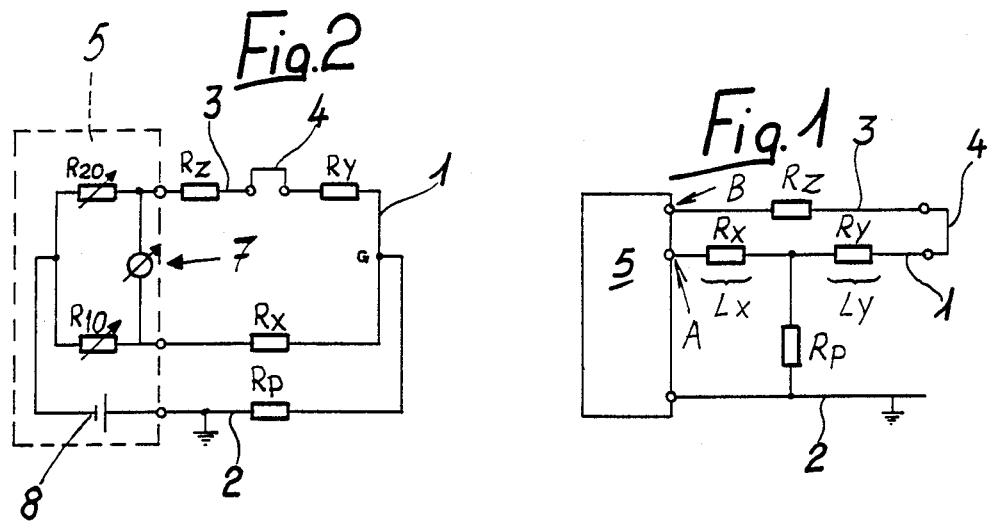
PRIOR ART
Fig. 2
Fig. 1
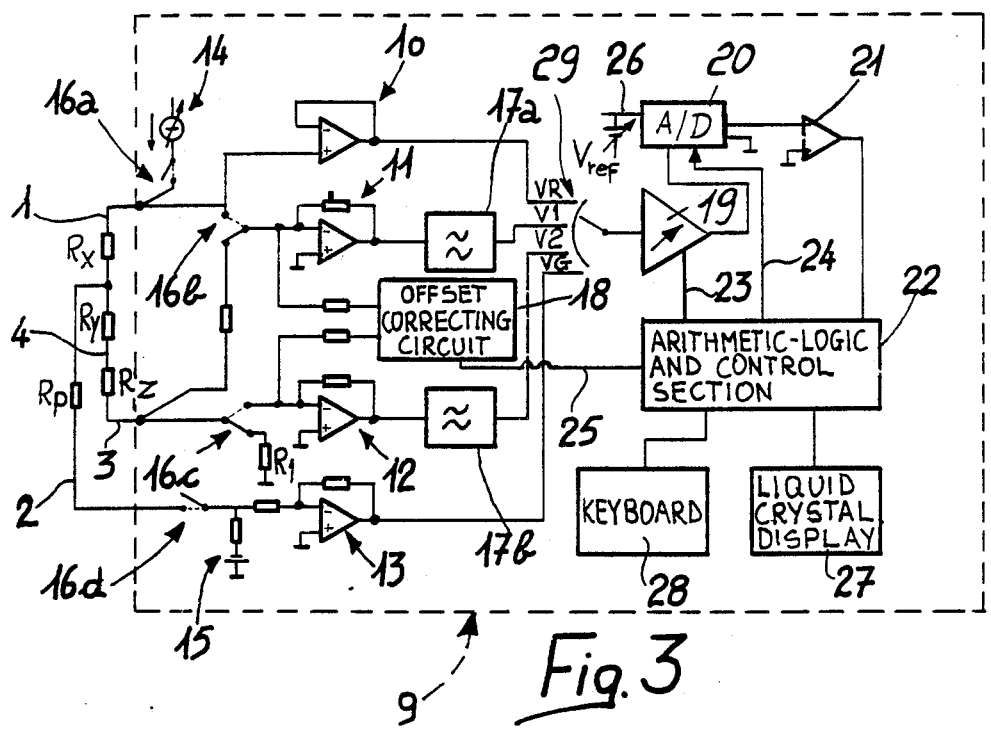
Fig. 3

AUTOMATIC TELEPHONE LINE FAULT LOCATOR

BACKGROUND OF THE INVENTION

The invention relates to an automatic telephone line fault locator.

As known, usually faults in automatic telephone lines are due to low insulation between wires in a cable or between a cable wire and the earth braid. For servicing the telephone network, it is, therefore necessary that the faulty points be located, which faults may be brought about by either mechanical or electrical stresses, or moisture penetration following corrosion, with consequent likely occurrences of shorts or, more generally, resistive drops between the leads in the cable.

From a strictly operative standpoint, faultfinding involves a degree of accuracy which depends on the particular nature of the line being inspected: with an overhead cable, it is sufficient as a rule to locate the cable span including the faulty spot. whereas with an underground line, the margin for error must of the order of fractions of a meter to avoid useless and costly excavation work.

One of the most widely employed known instruments for fault locating is Wheatstone bridge which, however, has some shortcomings mainly originating from the fully manual measurement the result whereof depends on the operator's skill, while requiring elaborate calculations and the use of tables to achieve the target result.

SUMMARY OF THE INVENTION

It is the primary aim of this invention to eliminate such prior problems by providing a locator which can carry out all the measurements required to obtain the desired information automatically.

A further important object is to provide an automatic fault locator for telephone lines whose operation is unaffected by the skill level of the operator.

Another object is to provide an automatic locator which is easily carried around, while having a small size and weight as well as low consumptions.

Another object is to provide an automatic telephone line fault locator which enables obtainment of measurements affected by a low error due to noise and which can warn at the same time of the existence of conditions preventing measurement within preset accuracy limits.

These an other objects are achieved by an automatic telephone line fault locator, characterized by an interface section including switching means and having input terminals for connection to a line being controlled, a voltage and current measuring section electrically connected to said interface section and including a plurality of voltage and current measuring means selectivably connectable to said line through said interface section, a control unit including a logic-arithmetic and control section electrically connected to said interface section and said measuring section for controlling the position of said switching means and receiving from said measuring section signals proportional to the voltage drops on, and the currents flowing through, different portions of the line being controlled, thereby said logic-atithmetic and control section calculates the position of any fault in the line being controlled.

BRIEF DESCRIPTION OF THE DRAWINGS

Further features and advantages of the invention will become apparent from the following detailed description of a locator, as shown in the accompanying drawing sheets, where:

FIG. 1 shows a schematic diagram of the system subjected to measurement;

FIG. 2 is a diagram for measurement by connection to a Wheatstone bridge;

FIG. 3 shows a block diagram of the automatic fault locator according to the invention:

DESCRIPTION OF THE PREFERRED EMBODIMENT

Figure 4:
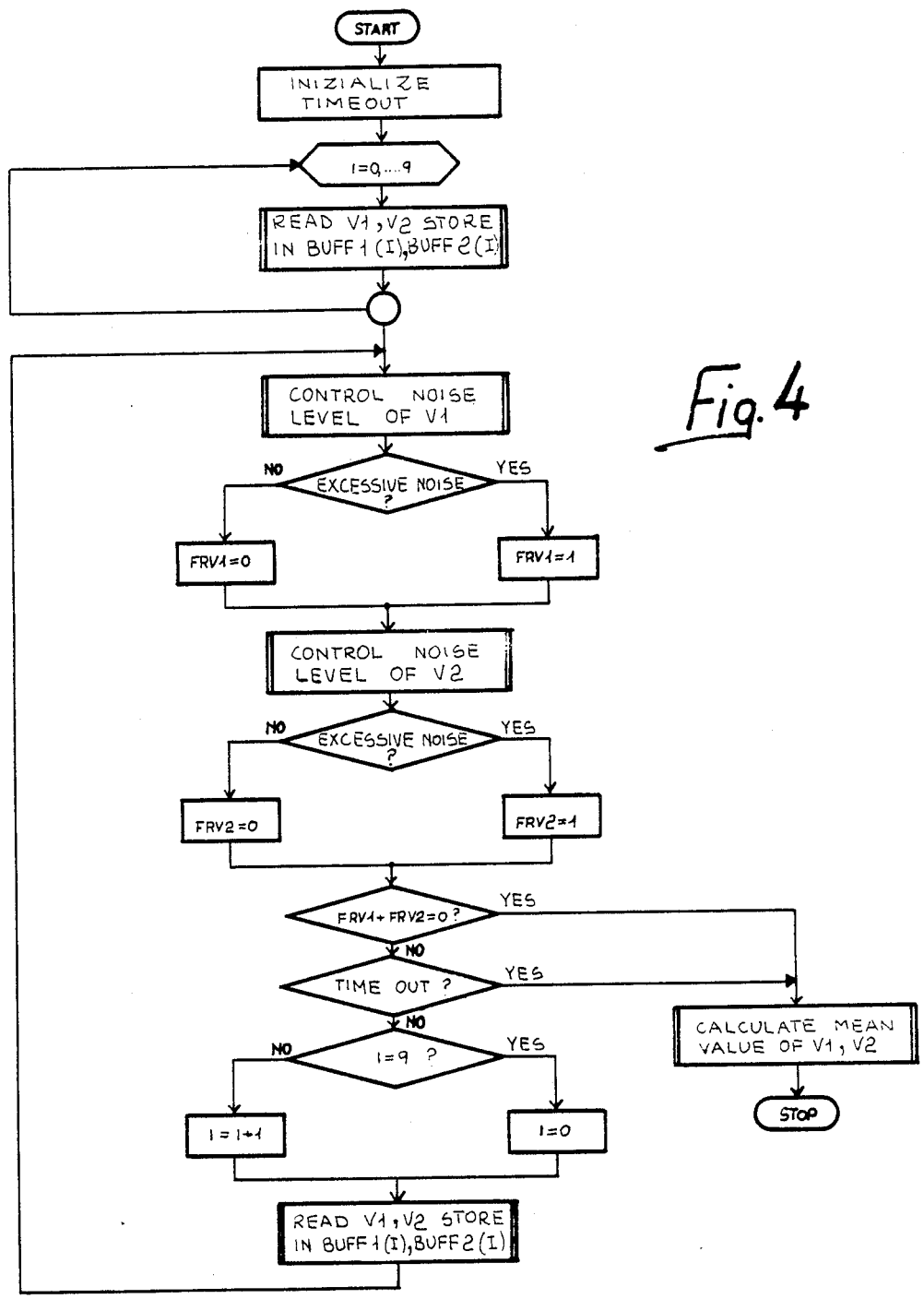
FIG. 4 is a flowchart of a voltage measurement with noise filtration.

With reference to FIG. 1, to locate a faulty point, indicated at the character G, use of other leads is required besides the faulty one, indicated at the numeral 1.

Under "faulty lead" a wire is meant which has low insulation as due, for convenience of illustration, solely to resistive losses between said wire 1 and ground, the latter being designated by the numeral 2. A lead unaffected by such losses will be designated, instead, by the numeral 3 and also referred to hereinafter as good wire.

FIG. 1 shows a schematic diagram of the system being measured, indicating at Rx and Ry the resistances associated with the different parts into which the faulty wire 1 is divided. The letterword Rp designates instead the loss resistance to ground, whilst the numeral 4 designates a shortcircuit placed by the personnel at the end of the line, that shortcircuit being necessary for carrying out the measurements, whilst designated Rz is the resistance of the good wire 3.

The measurement is aimed at supplying the distance between a gage 5 and the faulty point G, or the distance from the latter to the point of shortcircuit formation 4, such distances having been drafted in the figure by the letterwords Lx and Ly.

According to the prior art, during a first step the ratio is measured between the resistances Rx and (Ry+Rz): then, upon acquiring the value of the sum (Rx+Ry+Rz) by an independent measurement, it is possible to obtain Rx, and by arithmetic operations, Lx, like considerations applying to Ry and Ly.

The most critical operation is that of acquiring the resistance ratio, to be usually obtained with traditional instruments by balancing a Wheatstone bridge.

The gage 5 uses a zero detector indicated with the numeral 7, two variable resistances designated at R1 and R2, and a power source designated with the numeral 8.

On reaching the balance condition, that is on the current flown through the detector 7 being nil, the ratio between the resistances Rx and (Ry+Rz) will be equal to the ratio between known resistances R1 and R2.

As previously pointed out, the gage 5 has limitations due especially to the manual character of the measurement.

On the contrary, according to the invention, an automatic fault locator 9, drafted in FIG. 3, is used, including, at the connections to the wires 1, 2 and 3, a first interface section comprising a DC variable current source 14 and a DC voltage source 15 as well as, between the latter and the connections to the telephone line, relay switches 16a, 16b, 16c and 16d.

The locator 9 further comprises a current and voltage measuring section including four amplifiers 10-13.

The amplifiers 11 and 12 are connected at the outputs thereof to two lowpass filters 17a and 17b of the second order, and at the inputs, with the interposition of resistances, to an offset voltage correcting circuit 18 (voltages of thermoelectric origin) placed in series to both the faulty wire 1 and the good wire 3.

The amplifiers 10 and 13 and the filters 17a and 17b are, moreover, connectible (as through a multiplexer 29) to a control unit including an electronic circuit 19 consisting of a programmable gain amplifier connected to a further electronic circuit 20 formed of a digital-to-analog and analog-to-digital converter controlled by a centralized logics.

The converter 20 is connected to a comparator 21 connected to a logic-arithmetic and control section 22 defining the centralized logics, that section being connected over the lines 23, 24 and 25 to the electronic circuits 18, 19 and 20.

The converter 20 is also connected to a programmable reference voltage Vref at the input terminal 26.

The logic-arithmetic and control section is also connected to devices for talking to the operator, consisting for example of a liquid crystal display 27 and a keyboard 28 which allows selection of the various tests and entry of the cable characteristics parameters.

The use of the automatic locator 9 envisages essentially five steps: insulation test, continuity test, selection of the diameter of the faulty wire, faulty wire temperature data entry, and measurement of the distances and resistances associated therewith.

By means of the keyboard 28 it will become possible to initiate one of such procedures called on the liquid crystal display 27.

The first test of insulation, consists of measuring the loss resistance indicated at Rp.

During this step, the switch 16d is closed (in the position shown in FIG. 2 by a dash line), the switch 16a is open (as shown with continuous line), the switch 16b is in its position connecting the amplifier 11 to line 1 (dash line) and the switch 16c is in its position connecting the amplifier 12 to line 3 (as shown in dash line). Thereby voltage source 15 feeds the external circuit. In this condition, amplifiers 11 and 12 operate as ideal amperometers, measuring the current flowing therethrough. In detail, the sum of the current flowing in amplifiers 11 and 12 is circa proportional to the current flowing through Rp. thereby the sum of the voltages V1 and V2 gives the value of this current. The voltage drop on Rp can be measured through amplificator 13 as (being Rp ))(Rx+Ry+Rz)) the voltage VG measured by amplifier 13 substantially corresponds to the desired voltage drop. The values V1, V2, V4 are then fed to the section 22 through the multiplexer 29, thereby the sought resistance value Rp can be calculated from the ratio VG/(V1+V2). This value is, of course, displayed together with an indication allowing the operator to evaluate the possibility of completing the measurements with sufficient accuracy, as it will be explained thereafter.

Subsequently, the locator will suggest to the operator effectuation of the second step, which consists of evaluating the correctness of the corrections and in particular the efficiency of the short circuit 4 placed at one end of the line across the cables 1 and 3. In particular a volt-amperometric measurement is carried out, by measuring the current flowing through the examined resistance and the voltage drop on it. During this step the switch 16g is closed (as shown in dash line in FIG. 3), the switch 16b is in its position connecting amplifier 11 to line 3 (as shown with continuous line), the switch 16c connects line 3 to shunt resistance R1 (as shown with continuous line) while switch 16d is open (as shown with continuous line). Thereby the amplifier 10 measures the voltage drop on (Rx+Ry+Rz+R1). This value is then fed as VR to section 22. Then the multiplexer connect the output V1 of the amplifier 11 to the section 22. In this case V1 represents the voltage drop on R1, thereby, by knowing the resistance value of R1, the section 22 is able to calculate the current flowing through it (as well as Rx+Ry+Rz). Thereafter, the section can calculate the voltage drop on (Rx+Ry+Rz) as difference between VR and V1 and then, by a simple division, the resistance value (Rx+Ry+Rz) including also the resistance value of the shortcircuit 4. Also here, the locator allows evaluation of the possibilty of completing the measurements with sufficient accuracy.

It should be pointed out that in this second step, the variable current source 14 is under program control, so as to bring the voltage on which the measurement is being carried out as close as possible to the scale end.

In this part of the circuit, the single component of high precision is the shunt resistance R1, the actual measurement current not being imposed accurately but rather measured on same.

Then, through the keyboard 28, it will be necessary to set the temperature and diameter of the faulty wire 1 in order to obtain reliable distance indications.

The final measurement step comprises several operations: first of all, the ratio is measured of the resistance Rx and (Ry+Rz).

During this step, switch 16a is open, switch 16b connects amplifier 11 to line 1 (as shown by the dash line), switch 16c connects amplifier 12 to line 3 (as shown by the dash line), while switch 16d is closed (as shown with dash line). As Rx and (Ry+Rz) form a current divider (in fact the voltage drop on these two branches is equal, as set by the low resistance Rp), the current flowing in the amplifiers 11 and 12 are inversely proportional to Rx and (Ry+Rz) respectively. As also in this step the amplifiers carry out a current-voltage conversion (the input terminal being at virtual ground and the input resistance nil), they operate as ideal amperometers and feed the section 22 with the values V1 and V2 which are elaborated to obtain the ratio of Rx and (Ry+Rz).

The following step consists of effecting the measurement of the resistance (Rx+Ry+Rz).

Then, the locator 9 carries out the operations for computing the resistance Rx and the length Lx: as to the determination of the value for the resistance Ry, the automatic locator 9 uses the relationship (Rz=Rx+Ry) or the availability of a second "good wire" to carry out a direct measurement of (Rx+Ry), that procedure being provided by the locator which acknowledges in an automatic fashion the actual availability of a second good wire as properly connected.

Lastly, the values of the lengths Lx and Ly and the corresponding resistance Rx and Ry are displayed on the display 27.

All the measurements are carried out repeatively, the average values being used and displayed.

Where excessive variability of the quantity being measured is found, attributable to noise, the locator also envisages warning of the presence of line noise.

The locator further envisages a selftesting function, it being able to check calibration of the precision circuits by merely operating, on request from the operator, on a test line of perfectly known characteristics.

Thus, it is possible to carry out all the tests and to compare the results with rating or to initiate a suitable selfdiagnosis procedure bringing out in a concise message the degree of calibration.

The automatic locator 9 may be provided with numerous auxiliary circuits, such as a separate circuit effecting a check on the operability of the centralized logics which, in the presence of any malfunctions, interrupts the program flow giving an indication of it to the operator by a light signal, for example.

FIG. 4 shows the flowchart of the measurement of the voltages designated with V1 and V2 at the outputs from the filters 17a and 17b, comprising the residual noise filtration algorithm by averaging the results of multiple measurments.

In that chart BUFF 1 (n) and BUFF 2 (n) designate the buffers for storing ten readings of the voltages V1 and V2, whilst FRV 1 and FRV 2 designate two flags which, in the presence of a noise level of the voltages V1 and V2, take up a given logic value.

The noise filtering procedure operates on the two signals V1 and V2, with each of them there being associated a buffer for storing ten readings.

After filling the two buffers, a check is carried out for detecting the noise level in the stored voltages V1, V2, and if for one of the two signals the check issues a negative result (high noise), the buffers are updated by replacing the earlier reading with a fresh one.

Then the check is repeated and the buffers are possibly updated with fresh readings until the check is passed by both signals.

This check is to be passed within a set time limit, or else the presence of the noise is signified.

In any case, eventually, the values of V1 and V2 are set equal to the averages of the last ten readings stored in the buffers.

Figure 5:
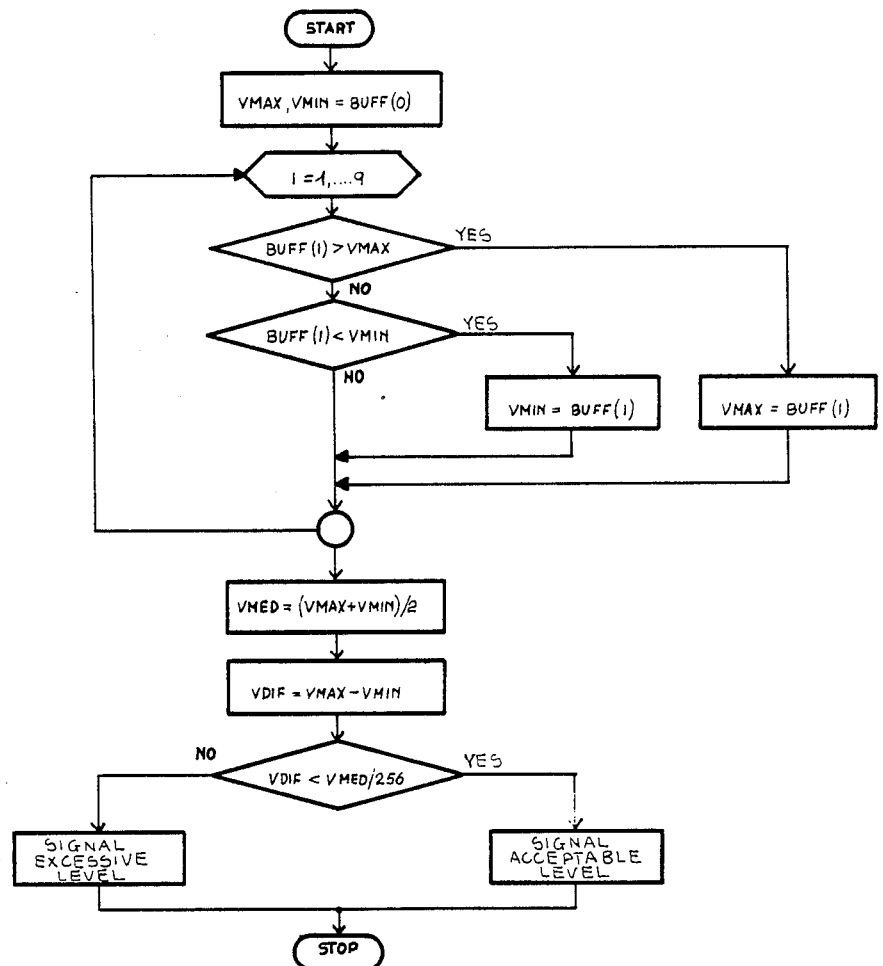
FIG. 5 is a flowchart of the noise level control.

The flowchart shown in FIG. 5 illustrates instead the noise level check: that check is carried out on the ten readings contained in each of the two buffers.

Then, the maximum value and minimum value are computed and it is checked that their difference does not exceed the largest from a fixed value (offset) and a value proportional to the average one.

In that Figure VMAX denotes the maximum value of the ten readings and VMIN denotes the minimum value.

Figure 6:
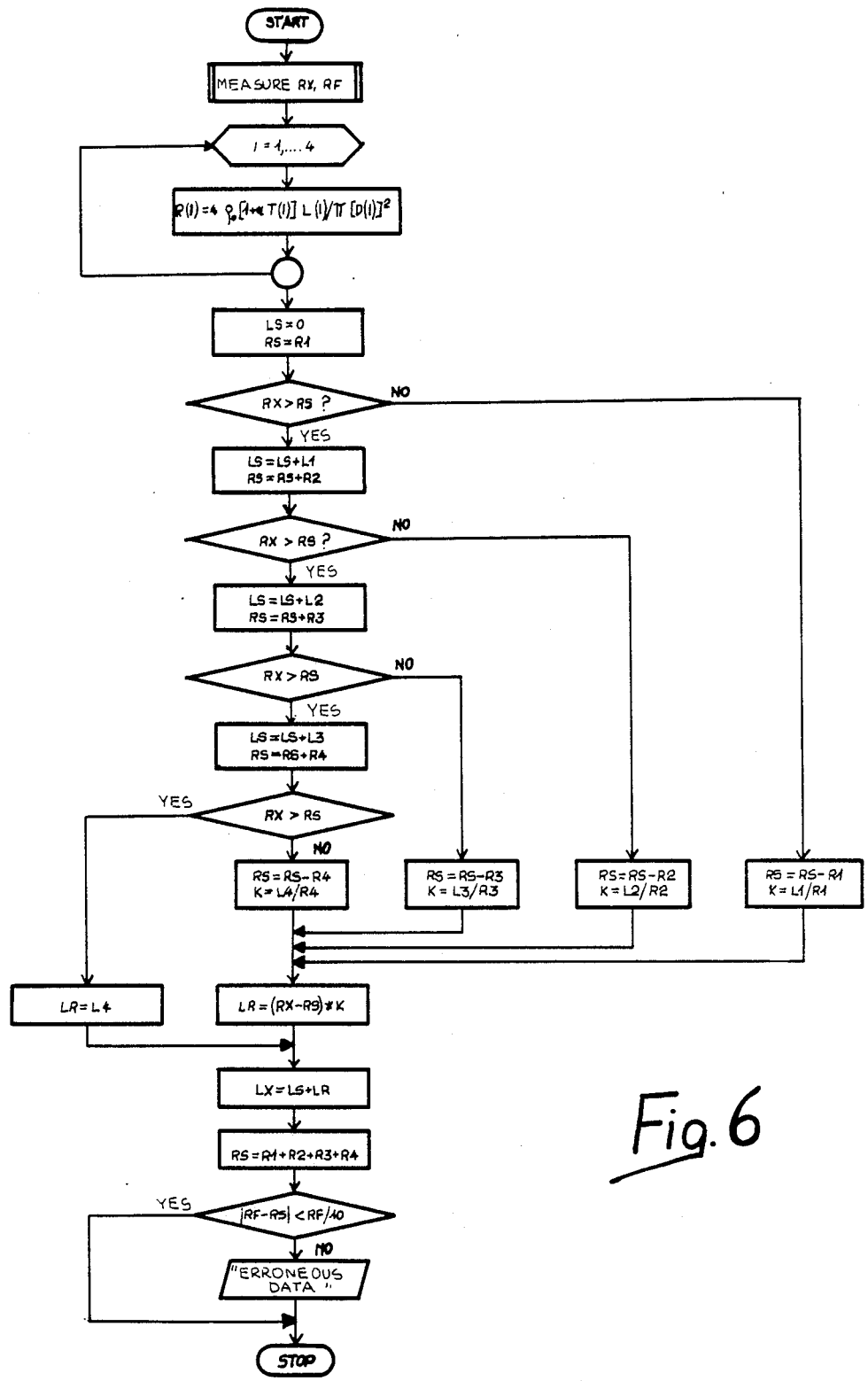
FIG. 6 is a flowchart for fault location over non-homogenous sections.

FIG. 6 shows instead the flowchart for fault locating over non-homogeneous sections, that is when the line results from the connection of several leads with different cross-sections and/or at different temperatures (and therefore with different resistance values per unit length).

In this case, to locate the fault it is necessary to know the length, temperature, and diameter of the leads defining the various sections.

Then measurement of the resistances Rx (resistance seen between the gage and faulty point) and Rf (resistance of the faulty wire) is carried out.

Then, by utilizing the length, temperature, and diameter data for each individual section, assuming a connection of four leads, the resistances R1, R2, R3 and R4 relating to each section are computed.

For the non-used sections, length and the associated resistance should be regarded as nil.

By comparing the values Rx and R1, R2, R3 and R4, the faulty section is located and, hence, the distance Lx of the latter from the gage is located.

Then the sum of R1, R2, R3 and R4 is verified as being equal to the measured value Rf so as to be able to warn the operator of the presence of erroneous data.

In this flowchart, L(I), T(I), D(I) respectively indicate the length, temperature and diameter of the considered sections, whilst in the formula utilized for computing the resistance R(I) of each section $\rho_0$ is the resistivity at 0° C., and $\alpha$ is the temperature coefficient.

Therefore, this invention has achieved all the objects set forth, the automatic locator facilitating servicing and maintenance of the telephone network and checking restoration to the proper operating condition, also fully ensuring precision and reliability features of the surveys thanks to the ability for checking and processing deriving from the use of microprocessors.

The particular sequence of tests with operator guide step by step minimizes the number of the operations and the time required to carry out such measurements and reduces the possibility of errors.

The utilization of electronic circuits also makes the combination of the structure making up the locator of such a size and weight as to fit inside a box-type structure easily carried by the operator. Utilization in all the circuit sections of advanced technology components affords low consumptions.

Of course, the invention herein is susceptible to many modifications and changes within the scope of the same inventive concept.

The materials, characteristics and dimensions of the components may be any one as needed.

We claim:

1. An automatic device for locating resistance faults on telephone cables including a first and a second telephone lines and a reference telephone line, with the first, second and reference telephone lines having first and second ends and with the first and second telephone lines being mutually connected through a fault resistance interposed between intermediate points of the first and second telephone lines, with said intermediate points being comprised between the first and second ends of the first and second telephone lines, said automatic device comprising:

short-circuit means for connection between the first ends of the first telephone line and the reference telephone line. an interface section including first, second and third input terminals for connection to, respectively, the second ends of the first, second and reference telephone lines, voltage and current source means, first switching means interposed between said source means and said input terminals, second switching means connected to said input terminals, a voltage and current measuring section including a plurality of voltage and current measuring means connected to said second switches for selective connection to said first, second and reference telephone lines and for selectively measuring voltage drops on and current flowing through said lines, a control unit including a logic-arithmetic and control section electrically connected to said first and second switching means and said voltage and current measuring section for controlling the position of said switching means and receiving from said voltage and current measuring means measured voltage drops and currents and calculating resistances of different portions of said lines including the resistance of portion of the first telephone line which is comprised between the second end and the intermediate point of the first telephone line, said logic-arithmetic and control section having resistance to length converting means for calculating the length of said portions of lines.

2. An automatic device according to claim 1, wherein said voltage and current measuring means comprises at least four measure amplifiers, and said control unit further comprises an analog-to-digital converter means interposed between said measure amplifiers and said logic-arithmetic and control section.

3. An automatic device according to claim 2, wherein said control unit further comprises a controlled amplifier connected between said measure amplifiers and said analog-to-digital converter means, said analog-to-digital converter means having further an input connected to a programmable reference voltage and an output connected to comparator means interposed between said analog-to-digital converter means and said logic-arithmetic and control section.

4. An automatic device according to claim 1, wherein said logic-arithmetic and control section is connected to display means and keyboard means for displaying messages from said logic-arithmetic and control section and for receiving external controls and data, including line temperature and diameter data to be supplied to said logic-arithmetic and control section.

5. An automatic device according to claim 1, wherein said voltage and current measuring means comprise at least a first and a second measure amplifiers, said first switching means comprises a first switch interposed between a current source and said first input terminal and a second switch interposed between a voltage source and said third input terminal, and said second switching means comprises a third switch interposed between said first and second input terminals and said first measure amplifier for selectively connecting said first measure amplifier to said first and second input terminals, and a fourth switch interposed between said second measure amplifier, said second input terminal and a shunt resistance means of known value for selectively connecting said second input terminal to said second measure amplifier and said shunt resistance means of known value.

6. An automatic device according to claim 1, wherein said logic-arithmetic and control section comprises means for storing voltage signals fed by said voltage and current measuring section, means for calculating minimum and maximum values of said voltage signals, difference values between said minimum and said maximum values and an average value, means for comparing said difference values with a first preset value and a second value which is proportional to said average value, and means for signalling excessive noise when said difference values exceed selectively said first preset value and said second value.

7. An automatic device for locating resistance faults on a telephone line. For connection to a controlled telephone line, a reference telephone line and a reference potential line, with the controlled telephone, reference telephone and reference potential lines having first and second ends, with the controlled telephone line and the reference potential line being mutually connected through a fault resistance interposed between intermediate points of the controlled telephone and reference potential lines, with said intermediate points being comprised between the first and second ends of the controlled telephone and reference potential lines, said automatic device comprising:

short-circuit means for connection between the first ends of the controlled telephone line and the reference telephone line, an interface section including first, second and third input terminals for connection to, respectively, the second ends of the controlled telephone, reference telephone and reference potential lines, voltage and current source means.

first switching means interposed between said source means and said input terminals.

second switching means connected to said input terminals, a voltage and current measuring section including a plurality of voltage and current measuring means connected to said second switches for selective connection to said controlled telephone line, reference telephone line and reference potential line and for selectively measuring voltage drops on and current flowing through said lines, a control unit including a logic-arithmetic and control section electrically connected to said first and second switching means and said voltage and current measuring section for controlling the position of said switching means and receiving from said voltage and current measuring means measured voltage drops and currents and calculating resistances of different portions of said lines including resistance of said controlled telephone line, resistance of said reference telephone line, the fault resistance and resistance of portion of the controlled telephone line which is comprised between said first input terminal and the fault resistance, said logic-arithmetic and control section having resistance to length converting means for calculating the length of said portions of lines.

8. An automatic device according to claim 7, wherein said voltage and current measuring means comprise at least a first and a second measure amplifiers, said first switching means comprises a first switch interposed between a current source and said first input terminal and a second switch interposed between a voltage source and said third input terminal, and said second switching means comprises a third switch interposed between said first and second input terminals and said first measure amplifier for selectively connecting said first measure amplifier to said first and second input terminals, and a fourth switch interposed between said second measure amplifier, said second input terminal and a shunt resistance means of known value for selectively connecting said second input terminal to said second measure amplifier and said shunt resistance means of known value.

9. An automatic device according to claim 7, wherein said logic-arithmetic and control section comprises means for storing voltage signals fed by said voltage and current measuring section, means for calculating minimum and maximum values of said voltage signals, difference values between said minimum and said maximum values and an average value, means for comparing said difference values with a first preset value and a second value which is proportional to said average value, and means for signalling excessive noise when said difference values exceed selectively said first preset value and said second value.

10. An automatic device for locating resistance faults on telephone cables including a first, a second and a third lines having each first and second ends, with the first and second lines being mutually connected through a fault resistance interposed between intermediate points of the first and second lines, with said intermediate points being comprised between the first and second ends of the first and second lines and the intermediate point of the first line defining a first and a second portions of the first line comprised between said intermediate point of said first line and, respectively, the first and the second end thereof, said automatic device comprising:

short-circuit means for connection between the first ends of the first and the third lines,
 first, second and third input terminals for connection to, respectively, the second ends of the first, third and second lines,
 means for applying a voltage on said third input terminal,
 means for measuring a first current flowing through said first input terminal and along said second portion of said first line,
 means for measuring a second current flowing through said second input terminal along said third line, said short-circuit means and said a first portion of said first line,
 means for calculating a first ratio between the resistance of the second portion of the first line and the sum of the resistances of the first and the third lines as ratio of said first current and the sum of the first and second currents,
 means for feeding a third current to said first terminal and to the first and third lines,
 means for measuring the sum of the voltage drops on the first and third lines,
 means for calculating a loop resistance defined by the sum of the resistances on the first and third lines, as ratio of said sum of voltage drops and said third current,
 means for calculating the resistance of said second portion as product of said first ratio and said loop resistance,
 means for calculating the length of said second portion as product of said resistance of said second portion with a resistance-to-distance factor.

* * * * *